(12) United States Patent
Sederquist

(10) Patent No.: US 6,444,179 B1
(45) Date of Patent: Sep. 3, 2002

(54) AUTOTHERMAL REFORMER

(75) Inventor: Richard Sederquist, Middletown, CT (US)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/684,170

(22) Filed: Oct. 5, 2000

Related U.S. Application Data

(60) Provisional application No. 60/157,731, filed on Oct. 5, 1999.

(51) Int. Cl.[7] .............................. B01J 8/02; B01J 7/00
(52) U.S. Cl. ...................... 422/191; 422/190; 422/193; 422/220; 422/198; 48/61; 48/76
(58) Field of Search ................................ 422/191, 193, 422/196–198, 190, 200–202, 220; 48/94, 61, 113, 176; 366/336

(56) References Cited

U.S. PATENT DOCUMENTS

| | | | | |
|---|---|---|---|---|
| 3,871,838 A | * | 3/1975 | Henkel et al. ................ | 48/107 |
| 4,098,587 A | * | 7/1978 | Krar et al. ..................... | 48/94 |
| 6,045,772 A | | 4/2000 | Szydlowski et al. ......... | 423/652 |

FOREIGN PATENT DOCUMENTS

| | | |
|---|---|---|
| DE | 37 26875 | 5/1988 |
| EP | 0 312 754 | 9/1988 |
| EP | 0 312 757 | 9/1988 |
| EP | 0 303 439 | 2/1989 |
| EP | 0 367 654 | 5/1990 |
| EP | 0 473 870 | 3/1991 |
| GB | 2 217 627 | 11/1989 |
| JP | 06-219706 | 8/1994 |
| WO | WO 98/49096 | 11/1998 |

OTHER PUBLICATIONS

Larsen et al., "Autothermal Reforming Turns Methanol Plant Off–Gas into a Low Cost Feedstock," *Nitrogen*, No. 222, pp. 37–40, Jul., 1996.

* cited by examiner

*Primary Examiner*—Hien Tran
(74) *Attorney, Agent, or Firm*—McAndrews, Held & Malloy, Ltd.

(57) ABSTRACT

An autothermal reformer for converting a fuel into a reformate stream comprising hydrogen comprises (a) a closed vessel having a top end and a bottom end, the vessel comprising at least one insulation layer adjacent the interior surface of the vessel; (b) a first reactant manifold disposed within the vessel for receiving and distributing a first reactant stream, the first reactant manifold having a plurality of mixer tubes extending therefrom, each of the mixer tubes having an inlet end and an outlet end, the mixer tubes disposed in a separator member; and (c) a second reactant manifold disposed within the vessel for receiving and distributing a second reactant stream, the second reactant manifold comprising a plurality of injection tubes. Each of the injection tubes has an inlet end and an outlet end, extend through the first reactant manifold and are fluidly isolated therefrom. The outlet end of each of the plurality of injection tubes extends into the inlet end of one of the mixer tubes, thereby forming a gap between the outer wall of the injection tube and the inner wall of the mixer tube. Methods of operating the present autothermal reformer are also provided.

39 Claims, 1 Drawing Sheet

AUTOTHERMAL REFORMER

CROSS-REFERENCE TO RELATED APPLICATION

This application is related to and claims priority benefits from U.S. Provisional Patent Application Ser. No. 60/157,731, filed Oct. 5, 1999, entitled "Solid Polymer Fuel Cell Power Generation System with Autothermal Reformer". The '731 provisional application is incorporated herein by reference in its entirety.

FIELD OF THE INVENTION

The present invention relates to autothermal reformers and methods of operating such reformers.

BACKGROUND OF THE INVENTION

The search for alternative power sources has focused attention on the use of electrochemical fuel cells to generate electrical power. Unlike conventional fossil fuel power sources, fuel cells are capable of generating electrical power from a fuel stream and an oxidant stream without producing substantial amounts of undesirable by-products, such as sulfur oxides, nitrogen oxides and carbon monoxide. However, the commercial viability of fuel cell systems will benefit from the ability to efficiently and cleanly convert conventional hydrocarbon fuel sources, such as, for example, gasoline, diesel, natural gas, ethane, butane, light distillates, dimethyl ether, methanol, ethanol, propane, naphtha, kerosene, and combinations thereof, to a hydrogen-rich gas stream with increased reliability and decreased cost. The conversion of such fuel sources to a hydrogen-rich gas stream is also important for other industrial processes, as well. Several technologies are available for converting such fuels to hydrogen-rich gas streams.

Steam reformers convert hydrocarbon fuels to hydrogen-rich reformate gas streams. Fuel and steam are reacted in reactors filled with catalyst (typically nickel-, copper- or noble metal-based), and primarily hydrogen, carbon dioxide ($CO_2$), and carbon monoxide (CO) are produced. For example, the following principal reactions occur in the steam reforming of methane (and natural gas):

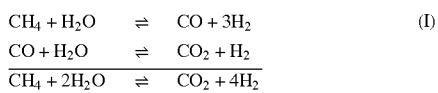

(I)

The overall reaction (I) is highly endothermic, and is normally carried out at elevated catalyst temperatures in the range of about 650° C. to about 875° C. Such elevated temperatures are typically generated by the heat of combustion from a burner incorporated in the steam reformer.

Steam reforming is generally unsuitable for heavier fuels and is normally limited to paraffinic naphtha and lighter fuels. In addition, nickel-based steam reforming catalysts are easily poisoned by sulfur in the fuel. As a result, if the fuel to be reformed contains sulfur, the reformer is usually preceded upstream by hydrotreating apparatus such as a hydrodesulfurizer (HDS) and an $H_2S$ removal device, such as a metal oxide absorbent bed, in order to remove or reduce to extremely low levels any sulfur present in the fuel. This tends to increase the cost and complexity of the overall fuel processing system. Thus, steam reformers are generally unsuitable for heavier and/or sulfur-laden fuels, such as gasoline or diesel, for example.

Autothermal reforming is an approach that combines catalytic partial oxidation and steam reforming. Partial oxidation employs substoichiometric combustion to achieve the temperatures to reform the fuel. Fuel, oxidant (oxygen or air, for example), and steam are reacted to form primarily hydrogen, $CO_2$ and CO. An advantage of autothermal reforming technology is that the exothermic combustion reactions are used to drive the endothermic reforming reaction (I).

Autothermal reformers typically employ noble metal catalyst beds operating at temperatures of from about 870° C. to about 1300° C. In comparison to steam reformers, an advantage of autothermal reformers is that at these high operating temperatures, sulfur in the fuel, which is present primarily as $H_2S$, does not significantly poison the catalyst and permits downstream sulfur removal. This may result in a simpler fuel processing system, as an HDS is not required. A further advantage of autothermal reformers is that start-up times also tend to be shorter due to the heat supplied to the catalyst bed by catalytic combustion of the fuel. Yet another advantage of autothermal reformers is that they are capable of reforming heavier fuels than steam reformers. Thus, autothermal reformers may be more desirable for use in fuel processing systems employing heavier and/or sulfur-laden fuels, such as gasoline or diesel fuel, for example.

However, conventional autothermal reformers have at least two major disadvantages, particularly with respect to fuel cell-related applications. First, conventional autothermal reformers and associated heat recovery equipment tend to be quite large, which impacts material costs and overall manufactured cost. This is especially disadvantageous in vehicular applications, where space is also at a premium. Second, it can be difficult to adequately vaporize fuels such as diesel, for example, and distribute the fuel uniformly within the catalyst bed employing conventional autothermal reformers. These disadvantages tend to be compounded in vehicular applications employing diesel, for example, as the fuel.

It is desirable to have a rugged, compact autothermal reformer capable of efficiently reforming difficult fuels, such as diesel.

SUMMARY OF THE INVENTION

An autothermal reformer for converting a fuel into a reformate stream comprising hydrogen is presented. The present reformer comprises:

(a) a closed vessel, the vessel having a top end and a bottom end, the vessel comprising at least one insulation layer adjacent the interior surface of the vessel;

(b) a first reactant manifold disposed within the vessel for receiving and distributing a first reactant stream, the first reactant manifold having a plurality of mixer tubes extending therefrom, each of the mixer tubes having an inlet end and an outlet end, the injection tubes disposed in a separator member; and (c) a second reactant manifold disposed within the vessel for receiving and distributing a second reactant stream, the second reactant manifold comprising a plurality of injection tubes, each of the injection tubes having an inlet end and an outlet end, the injection tubes extending through the first reactant manifold and fluidly isolated therefrom;

wherein the outlet end of each of the plurality of injection tubes extends into the inlet end of one of the mixer tubes, forming a gap between the outer wall of the injection tube and the inner wall of the mixer tube.

Preferably, the gap between the mixer tubes and corresponding mixer tubes is an annular gap.

In one embodiment of the present reformer, the first reactant stream comprises substantially vaporized fuel and the second reactant stream comprises oxidant.

In a preferred embodiment, the first reactant stream comprises oxidant and the second reactant stream comprises substantially vaporized fuel.

The injection tubes and mixer tubes are arranged so as to uniformly mix and distribute the reactant stream within the present reformer. For example, the injection tubes and mixer tubes may be arranged in a hexagonal array.

The mixer tubes may comprise openings in the separator member and cooperating openings in one end of the first reactant manifold. Preferably, the first reactant manifold and mixer tubes form a shell-and-tube assembly. The length of the mixer tubes may be at least ten times the inner diameter of the mixer tubes.

The separator member that the mixer tubes are disposed comprises insulating material, preferably a ceramic composition.

The present reformer further comprises a reforming section disposed within the vessel, the reforming section comprising a combustion and gasification catalyst bed spaced apart from and in fluid communication with the reactant mixer layer, and a steam reforming catalyst bed in contact with the combustion and gasification catalyst bed. The cooperating surfaces of the reactant mixer layer and the combustion and gasification catalyst bed form a plenum therebetween. The combustion and gasification catalyst bed preferably comprises at least one monolith comprising noble metal catalyst components disposed on a porous support, where the support is preferably a ceramic honeycomb. Similarly, the steam reforming catalyst bed preferably comprises at least one monolith comprising noble metal catalyst components disposed on a porous support, where the support is preferably a ceramic honeycomb. The plenum may also be at least partially filled with a particulate combustion and gasification catalyst, preferably comprising noble metal catalyst components disposed on a pelletized porous support.

Another embodiment of the present reformer further comprises a first heat exchange member disposed within the vessel and in thermal communication with the reformate, the first heat exchange member for receiving a steam stream and superheating the stream therein by heat exchange with the reformate. The first heat exchange member may comprise a helical coil, for example. Preferably, the first heat exchange member comprises a bare helical coil disposed within a high temperature alloy steel metal annulus packed with high-temperature metal heat transfer packing, such as high void fraction pall rings or saddles, for example.

Yet another embodiment of the present reformer further comprises a second heat exchange member disposed within the vessel and in thermal communication with the reformate, the second heat exchange member for receiving a feed stream comprising water and vaporizing the feed stream therein by heat exchange with the reformate to produce a steam stream. The heat exchange member may comprise a helical coil, for example. Preferably, the helical coil comprises a finned tube helical coil disposed within an alloy steel sheet metal annulus.

Still another embodiment of the present reformer further comprises the first heat exchange member and the second heat exchange member, as described.

In another embodiment, the present reformer further comprises a fuel vaporizer for substantially vaporizing the fuel in the presence of superheated steam, the fuel vaporizer disposed within the vessel and comprising a helical coil. In further embodiments, the present reformer comprises the fuel vaporizer and the first heat exchange member, or the fuel vaporizer and the second heat exchange member. In another preferred embodiment, the present reformer comprises the fuel vaporizer, the first heat exchange member, and the second heat exchange member.

In a further embodiment, the present reformer further comprises the first and second heat exchange members, and external heat exchange members associated with the external surface of the vessel for flowing a heat exchange fluid therethrough. In yet another preferred embodiment, the present reformer further comprises the fuel vaporizer. Either embodiment may further comprise an external insulating layer adjacent the exterior surface of the vessel.

The external heat exchange members may comprise plate coil or helical coil, for example. Preferably, the heat exchange fluid comprises the feed stream.

Methods of operating the present autothermal reformer are also provided.

In one method, the reformer comprises a closed vessel, the vessel having a top end and a bottom end, a reforming section disposed within the vessel for catalytically converting a reactant stream comprising fuel to a reformate stream comprising hydrogen, and a fuel vaporizer disposed within the vessel, the fuel vaporizer comprising a helical coil. The method comprises:

(a) supplying a liquid fuel and a superheated steam stream to the fuel vaporizer;

(b) substantially vaporizing the fuel in the fuel vaporizer to produce a vaporized fuel stream;

(b) mixing the vaporized fuel stream with an oxidant stream to produce a reactant stream; and (d) supplying the reactant stream to the reforming section.

The superheated steam stream is preferably supplied to the fuel vaporizer at a temperature of about 800° C. Where the liquid fuel comprises diesel, the diesel may be supplied to the fuel vaporizer at a temperature of about 300° C., if desired. Preferably, where the liquid fuel comprises diesel, the vaporized fuel stream exits the fuel vaporizer at a temperature of at least about 425° C.

In another method of operating the present autothermal reformer, the reformer comprises: a closed vessel, the vessel having a top end and a bottom end, the vessel comprising a product outlet and at least one insulation layer adjacent the interior surface of the vessel; a reforming section disposed within the vessel for catalytically converting a reactant stream comprising fuel to a reformate stream comprising hydrogen; a first heat exchange member disposed within the vessel, the first heat exchange member in thermal communication with the reformate; and, a second heat exchange member disposed within the vessel and fluidly connected to the first heat exchange member and in thermal communication with the reformate. The method comprises:

(a) supplying the reactant stream to the reforming section and producing a reformate stream;

(b) supplying a feed stream comprising water to the second heat exchange member;

(c) flowing the reformate stream in heat exchange relation with the second heat exchange member to produce a steam stream therein;

(d) supplying the steam stream to the first heat exchange member;

(e) flowing the reformate stream in heat exchange relation with the first heat exchange member to produce a superheated steam stream therein; and (f) directing the reformate stream out of the vessel through the product outlet, wherein the temperature of the reformate stream is moderated by heat exchange such that the temperature of the reformate stream in direct contact with the insulation layer is no greater than about 650° C. preferably no greater than about 350° C.

The reformer may further comprise external heat exchange members associated with the external surface of the vessel for flowing a heat exchange fluid therethrough, and the method may further comprise flowing the heat exchange fluid through the external heat exchange members and maintaining the temperature of the vessel at a temperature below the operating temperature of the reformer. Preferably, temperature of the vessel is also maintained at a temperature above the internal gas dew point of the reformate stream. For example the temperature of the vessel may be maintained at a temperature of at least about 230° C. Preferably, the heat exchange fluid comprises the feed stream.

DETAILED DESCRIPTION OF PREFERRED EMBODIMENT(S)

Figure 1:
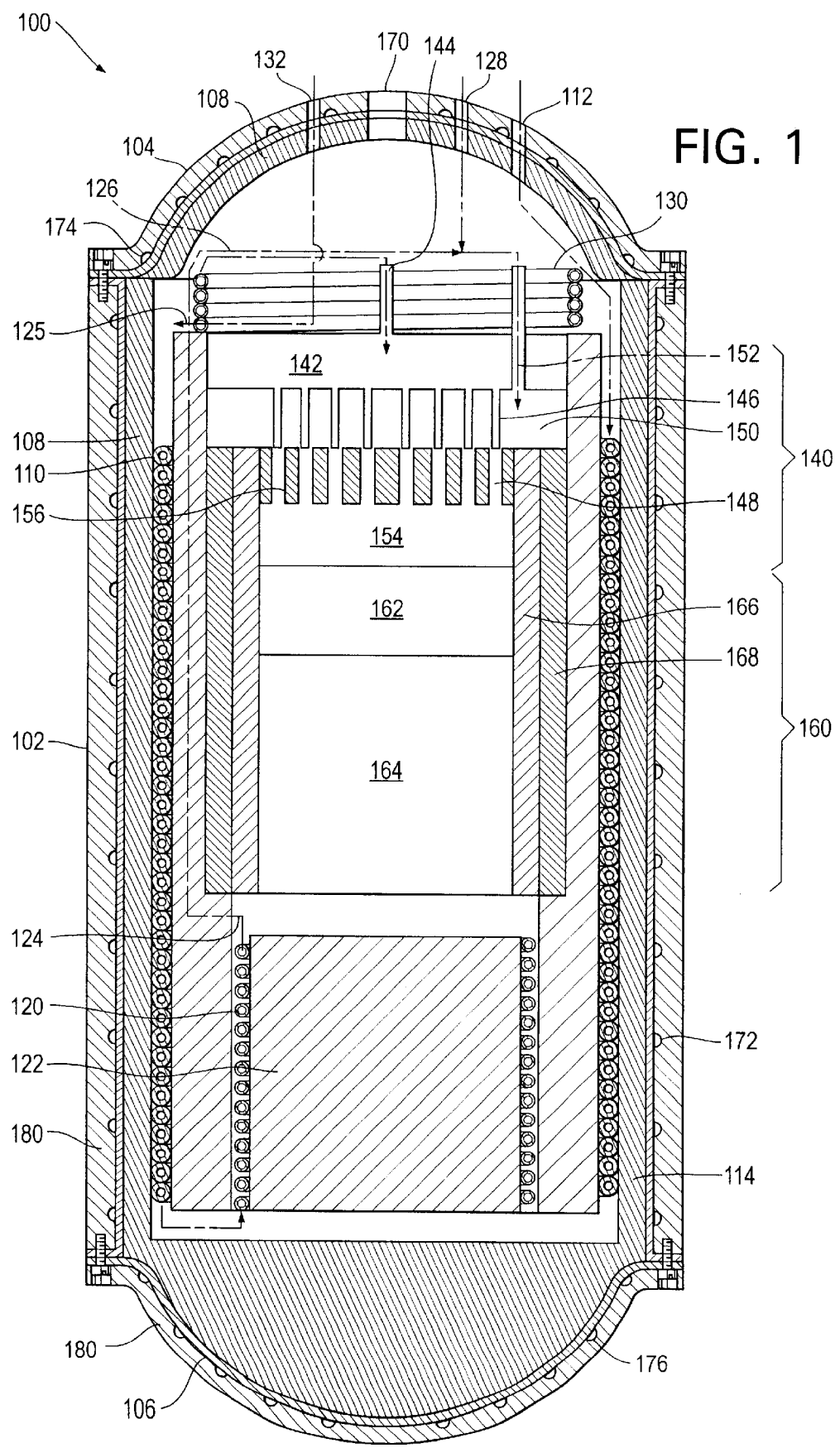
FIG. 1 is a schematic illustration in cross-section of an embodiment of the present autothermal reformer.

As used in this description and in the appended claims, fuel means gaseous or liquid fuels comprising aliphatic hydrocarbons and oxygenated derivatives thereof, and may further comprise aromatic hydrocarbons and oxygenated derivatives thereof. Reformate means the gas stream comprising hydrogen produced from a fuel by an autothermal reformer. Oxidant means substantially pure oxygen, or a fluid stream comprising oxygen, including air. As used herein, when two components are fluidly connected to one another, there may be other components in between them, and the other components may effect the fluid connection but not eliminate it altogether.

FIG. 1 is a schematic illustration in cross-section of an embodiment of the present autothermal reformer. High-pressure reformer vessel 100 comprises shell 102 and headers 104 and 106, respectively. The interior walls of vessel 100 have an insulating layer 108. Disposed within vessel 100 are water vaporizer 110, steam superheater 120, fuel vaporizer 130, and shell 135 containing reactant mixer 140, and autothermal reforming section 160.

In operation water, or preferably a water/steam mixture, is fed from feed water inlet 112 to water vaporizer 110. Water vaporizer 110 comprises a heat exchange coil disposed between insulating layer 108 and insulating layer 114. Water vaporizer 110 preferably comprises a finned tube helical coil disposed within an alloy steel sheet metal annulus. The water or water/steam mixture flows within water vaporizer 110 and is heated by heat exchange with the reformate stream exiting reforming section 160 to produce a steam stream. The temperature of the steam stream exiting water vaporizer 110 is preferably about 315° C.

The steam stream exiting water vaporizer 110 is then supplied to steam superheater 120. Steam superheater 120 comprises a heat exchange coil disposed between insulating layer 114 and insulating layer 122. Steam superheater 120 preferably comprises a bare helical coil within a high temperature alloy steel metal annulus packed with high-temperature metal heat transfer packing in the form of high void fraction pall rings or saddles. Metal packing having a thermal expansion coefficient similar to the coil and surrounding annulus is preferred, as it may prevent or limit slumping and compression of the packing during heating and cooling of the reformer. Other high-temperature heat exchange coil components may also be used, if desired.

The steam stream supplied to steam superheater 120 flows therein and is heated by heat exchange with the reformate exiting reforming section 160 to a temperature of approximately 815° C.

The superheated steam stream exiting steam superheater 120 is supplied via line 124 to splitter 125. A portion of the superheated steam stream (for example, about half of the stream) is supplied by splitter 125 to line 126, where it is mixed with oxidant from oxidant inlet 128 and supplied as an oxidant stream to reactant mixer 140 at a temperature of about 600° C. Other mixing arrangements for producing the oxidant stream may also be suitable, and are known to those skilled in the art.

The remainder of the superheated steam stream is supplied via splitter 125 to fuel vaporizer 130. Fuel vaporizer 130 comprises a heat exchange coil disposed within vessel 100. Liquid fuel, preferably diesel, is fed from fuel inlet 132 and is injected into fuel vaporizer 130. The fuel mixes with the superheated steam and exits fuel vaporizer 130, preferably at a temperature sufficient to ensure substantially complete vaporization and mixing of the fuel with the steam. Where the fuel is diesel, for example, the residence time of the fuel within fuel vaporizer 130 is preferably chosen so that at the exit the fuel is essentially completely vaporized and mixed with the steam at a temperature of about 425° C. The vaporized fuel stream exiting fuel vaporizer 130 is supplied to reactant mixer 140.

If desired, the fuel may be preheated before introduction into fuel vaporizer 130 to assist in vaporization of the fuel. For example, where the fuel is diesel, it may be preheated to a temperature of about 300° C. Fuel vaporizer 130 is also preferably sized to provide sufficient wetted heat transfer surface area, assuming the liquid fuel wets the wall of the coil, to substantially vaporize the fuel. Since there is a potential of long term fuel coking, fuel vaporizer 130 is also preferably located where it can be easily accessed and replaced, if required.

Reactant mixer 140 comprises fuel manifold 142, mixer tubes 148, oxidant manifold 150, and plenum 154. The vaporized fuel stream exiting fuel vaporizer 130 is supplied to fuel manifold 142 via fuel manifold inlet 144. The vaporized fuel stream is then directed into injection tubes 146 and is supplied to mixer tubes 148. Injection tubes 146 extend through oxidant manifold 150 and are fluidly isolated therefrom. The oxidant stream from line 126 is supplied to oxidant manifold 150 via oxidant manifold inlet 152. The oxidant stream is then directed to mixer tubes 148 through the preferably annular gaps between each of injection tubes 146 and corresponding mixer tubes 148. The oxidant stream then mixes with the vaporized fuel stream in mixer tubes 148 to form a reactant stream. The reactant stream exits mixer tubes 148 and enters plenum 154.

Fuel manifold inlet 144, fuel manifold 142, and injection tubes 146 are preferably suitably sized to ensure a substantially equal pressure drop across each of injection tubes 146 and thus a substantially even distribution of the vaporized fuel stream within each of mixer tubes 148. Similarly, oxidant manifold inlet 152, oxidant manifold 150, the inlet ends of mixer tubes 148 are also preferably suitably sized to ensure a substantially even distribution of the oxidant stream within each of mixer tubes 148.

Alternatively, the positions of the fuel and oxidant manifolds may be reversed, if desired. That is, the oxidant stream entering the oxidant manifold may be supplied to the mixer tubes via injection tubes extending through the fuel manifold, and the vaporized fuel stream entering the fuel manifold may be directed through preferably annular openings between the injection tubes and the mixer tubes. The arrangement discussed in the preceding paragraph is preferred, however, since it may reduce the chance of flame holding and coking of the fuel and thereby reduce the potential of carbon deposits forming on the walls of mixer tubes 148.

Mixer tubes 148 are disposed within insulator layer 156, which preferably comprises a ceramic insulator. Mixer tubes 148 may comprise openings in oxidant manifold 150 that cooperate with openings in insulator layer 156. However, it is preferable that mixer tubes 148 comprise tubes fixed to oxidant manifold 150 and extending at least part way into openings in insulator layer 156 adapted to receive the tubes, that is, oxidant manifold 150 and mixer tubes 148 are preferably in a shell-and-tube arrangement.

Preferably, mixer tubes 148 are appropriately sized to provide a high-velocity, low-residence mixing zone for facilitating mixing of the fuel and oxidant streams without any substantial homogeneous combustion occurring. Generally, the length of mixer tubes 148 should be at least 10 times the diameter thereof to ensure adequate mixing of reactants. Preferably, mixer tubes 148 are also disposed within insulator layer 156 such that the reactant stream is distributed substantially evenly within plenum 154. For example, mixer tubes 148 may be disposed in a hexagonal array within insulator layer 156. Insulator layer 156 and mixer tubes 148 may also cooperate to facilitate distribution of the reactant stream to plenum 154. For example, mixer tubes 148 may extend partially through insulator layer 156, and flared openings in insulator layer 156 may communicate with the downstream end of each of mixer tubes 148, to further facilitate distribution of the reactant stream within plenum 154.

The reactant stream in plenum 154 is supplied to reforming section 160, comprising combustion and gasification catalyst bed 162 and reforming catalyst bed 164. Plenum 154 is preferably sized to provide a low-volume distribution zone to facilitate a substantially even distribution of the reactant stream to the exposed surface of catalyst bed 162, and to limit or prevent homogeneous combustion of the reactant stream before it enters catalyst bed 162.

Preferably, plenum 154 is partially filled, more preferably completely filled (packed), with a particulate combustion and gasification catalyst. For example, plenum 154 may be packed with pelletized combustion and gasification catalyst on a low surface area support. The presence of particulate catalyst in plenum 154 may assist in minimizing homogeneous combustion and soot formation, and may increase the rate of clean catalytic combustion and gasification reactions. Further, particulate catalyst in plenum 154 may assist in distributing the reactant stream over the surface of catalyst bed 162 and moderating the temperature thereof by promoting endothermic steam reforming within catalyst bed 162 to some extent.

Catalyst bed 162 comprises at least one combustion and gasification catalyst monolith. Preferably, catalyst bed 162 comprises a ceramic monolith comprising noble metal catalysts and having a honeycomb structure with about 30 to 60 cells per cm$^2$. Suitable such catalyst monoliths are commercially available from Engelhard Corporation (Iselin, N.J.), for example. Generally, the oxygen present in the reactant stream reacts within catalyst bed 162 to oxidize a portion, but not all, of the fuel present in the reactant stream, resulting in an increase in temperature due to the exothermic oxidation reaction. At least some of the $C_5$ and heavier hydrocarbons in the fuel are cracked in catalyst bed 162 to lighter $C_1$–$C_4$ hydrocarbon fractions. Some steam reforming of the methane generated in catalyst bed 162 may also occur. At the same time, any sulfur compounds present in the reactant stream react within catalyst bed 162 to from primarily $H_2S$ (and possibly trace carbonyl sulfide).

The heated, partially oxidized and cracked reactant stream from catalyst bed 162 is then passed through reforming catalyst bed 164 where the reactant stream is reformed to produce a hydrogen-rich reformate stream. Catalyst bed 164 comprises at least one steam reforming catalyst monolith. Preferably, catalyst bed 164 comprises at least one ceramic monolith comprising a noble metal and having a honeycomb structure with about 30 to 60 cells per cm$^2$, such as those available from Engelhard Corporation (Iselin, N.J.), for example. The size and number of such monoliths may be selected to provide a steam reforming catalyst bed of a desired size appropriate for the desired output of the autothermal reformer.

Where plenum 154 contains particulate. combustion and gasification catalyst, it is preferably of the same type as the catalyst comprising catalyst bed 162.

Reforming section 160 is surrounded by ceramic liner 166 and insulating layer 168, respectively. Preferably, ceramic liner 166 and catalyst beds 162 and 164, respectively, also have substantially the same coefficient of thermal expansion, thereby reducing potential problems due to catalyst slumping, crushing and damage.

The reformate stream exits catalyst bed 164 at a temperature in the range of about 900° C. to about 1000° C. The reformate stream then flows through the passage defined by insulating layer 114 and insulating layer 122 and past steam superheater 120. The reformate stream is cooled by heat exchange with the steam flowing through steam superheater 120 to a temperature of about 650° C.

The cooled reformate stream is then directed to the passage defined by insulating layer 108 and insulating layer 114 and past water vaporizer 110. The reformate stream is further cooled by heat exchange with the fluid flowing through water vaporizer 110 to a temperature of about 300° C. The cooled reformate stream then exits vessel 100 via product outlet 170.

Insulating layers 108, 114, 122, and 168, each comprise a suitable insulating material for reducing heat loss from the interior of vessel 100 to the external environment. Each of insulating layers 108, 114, 122, and 168 may have a different heat transfer coefficient matched to the temperature, pressure and spatial characteristics of the interior components of the present autothermal reformer. Suitable insulating materials for a given application and reformer design are known to persons skilled in the art.

As described, reforming section 160 of the present autothermal reformer is also thermally isolated from vessel 100 by ceramic liner 166 and insulating layers 168, 114, and 108, respectively. In addition, the temperature of reformate gases in the vicinity of insulating layer 108 have been moderated by heat exchange to less than or equal to about 650° C, preferably less than or equal to about 350° C. Thus, the internal high temperatures of the autothermal combustion and reforming processes tend to be isolated and cannot interact with or overheat the walls of vessel 100.

Additionally, shell 102, header 104, and header 106 may further comprise heat exchange elements 172, 174, and 176, respectively. Heat exchange elements 172, 174, and 176 may comprise plate coil or integrated water coils having a heat exchange fluid flowing therethrough to prevent vessel 100 from overheating. Alternatively, any combination of shell 102, header 104, and header 106 may comprise heat exchange elements, as required, to prevent overheating of vessel 100.

Any suitable heat exchange fluid may be used in heat exchange elements 172, 174, and 176, such as thermal oils, water, or gas streams. Preferably, the heat exchange fluid comprises feed water to be supplied to water vaporizer 110, and maintains vessel 100 at a temperature of about 230° C. This arrangement may prevent vessel 100 from overheating as long as the system is pressurized with reactants. Further, this arrangement also allows the walls of vessel 100 to be maintained at a temperature above the dew point of the internal process gas, which may prevent internal condensation on the walls of vessel 100 or on internal insulation (which can potentially degrade the insulation).

The exterior walls of vessel 100 may also be covered with insulating layer 180 to further minimize heat loss and reduce the local touch temperature of the reformer. Preferably, insulating layer 180 comprises a waterproof, closed-cell foam insulation.

In an alternate embodiment of the present autothermal reformer, any combination of water vaporizer 110, steam superheater 120, and fuel vaporizer 130 may comprise separate components in heat exchange with the reformate stream exiting reforming section 160. In other words, the water vaporizer, steam superheater, and/or fuel vaporizer components of the present autothermal reformer need not be housed within a common vessel. For example, a steam superheater and water vaporizer could be connected in series in heat exchange relationship with the reformer to receive the reformate stream therefrom. Or, the steam superheater could be integrated in the reformer vessel, as described above, and a separate water vaporizer could be used. Similarly, the fuel vaporizer could independently be external to the autothermal reformer vessel or integrated therein. Other suitable heat exchange relationships and component configurations may be used, as desired, as will be evident to those skilled in the art.

The present autothermal reformer is capable of operation in a substantially vertical orientation, and can also be operated horizontally. The ability to operate horizontally is primarily due to the mixing of gaseous fuel and oxidant streams to produce a gaseous reactant stream, and the use of catalyst monoliths. In horizontal operation, if it is desired to employ particulate combustion and gasification catalyst in the plenum following the mixer tubes, it is preferable to completely fill (pack) the plenum with catalyst pellets. The ability to operate the present autothermal reformer horizontally may be of particular benefit in vehicular applications, where space constraints may make orienting a reformer vertically difficult or impossible.

In addition, by using multiple mixer tubes to distribute the gaseous reactant stream to the catalyst monoliths, non-uniform distribution of reactants through the monolith may be reduced or eliminated in the present autothermal reformer. This is also desirable, insofar as non-uniform distribution of reactants may result in a lower rate of conversion of reactants to reformate, and thus a lower fuel efficiency for the autothermal reformer. Non-uniform flow may also result in uneven heating of the catalyst monolith due to localized combustion, which may cause undesirable mechanical stress on the ceramic honeycomb during heating and cooling.

While particular elements, embodiments and applications of the present invention have been shown and described, it will be understood, of course, that the invention is not limited thereto since modifications may be made by those skilled in the art, particularly in light of the foregoing teachings. It is therefore contemplated that the appended claims cover such modifications as incorporate those features that come within the scope of the invention.

What is claimed is:

1. An autothermal reformer for converting reactants comprising a fuel and an oxidant into a reformate stream comprising hydrogen, said reformer comprising:
    (a) a closed vessel, said vessel having a top end and a bottom end, said vessel comprising at least one insulation layer adjacent the interior surface of said vessel;
    (b) a first reactant manifold disposed within said vessel for receiving and distributing a first reactant stream comprising one of said fuel and said oxidant, said first reactant manifold having a plurality of mixer tubes extending therefrom, each of said mixer tubes having an inlet end and an outlet end, said mixer tubes disposed in a separator member;
    (c) a second reactant manifold disposed within said vessel for receiving and distributing a second reactant stream comprising the other of said fuel and said oxidant, said second reactant manifold comprising a plurality of injection tubes, each of said injection tubes having an inlet end and an outlet end, said injection tubes extending through said first reactant manifold and fluidly isolated therefrom; and
    (d) a reforming section disposed within said vessel for receiving and converting said first and second reactant streams to a reformate stream comprising hydrogen;
    wherein said outlet end of each of said plurality of injection tubes extends into said inlet end of one of said mixer tubes, thereby forming a gap between said outer wall of said injection tube and said inner wall of said mixer tube.

2. The reformer of claim 1 wherein said first reactant stream comprises said fuel.

3. The reformer of claim 1 wherein said first reactant stream comprises said oxidant.

4. The reformer of claim 1 wherein said plurality of injection tubes and said mixer tubes are arranged in a hexagonal array.

5. The reformer of claim 1 wherein the length of said mixer tubes is at least ten times the inner diameter of said mixer tubes.

6. The reformer of claim 1 wherein said mixer tubes comprise openings in said separator member and cooperating openings in one end of said first reactant manifold.

7. The reformer of claim 1 wherein said separator member comprises insulating material.

8. The reformer of claim 7 wherein said insulating material comprises ceramic.

9. The reformer of claim 1 wherein said gap is an annular gap.

10. The reformer of claim 1, wherein said reforming section comprises a combustion and gasification catalyst bed spaced apart from and in fluid communication with said separator member, and a steam reforming catalyst bed in contact with said combustion and gasification catalyst bed, and said separator member and said combustion and gasification catalyst bed form a plenum therebetween.

11. The reformer of claim 10 wherein said combustion and gasification catalyst bed comprises at least one monolith comprising noble metal catalyst components disposed on a porous support.

12. The reformer of claim 11 wherein said support comprises a ceramic honeycomb.

13. The reformer of claim 10 wherein said steam reforming catalyst bed comprises at least one monolith comprising noble metal catalyst components disposed on a porous support.

14. The reformer of claim 13 wherein said support comprises a ceramic honeycomb.

15. The reformer of claim 10 wherein said plenum is at least partially filled with a particulate combustion and gasification catalyst.

16. The reformer of claim 15 wherein said particulate combustion and gasification catalyst comprises noble metal catalyst components disposed on a pelletized porous support.

17. The reformer of claim 10, further comprising a first heat exchange member disposed within said vessel and in thermal communication with said reformate stream, said first heat exchange member receiving a steam stream and superheating said stream therein by heat exchange with said reformate stream.

18. The reformer of claim 17 wherein said first heat exchange member comprises a helical coil.

19. The reformer of claim 18 wherein said helical coil comprises a bare helical coil disposed within a high temperature alloy steel metal annulus packed with high-temperature metal heat transfer packing.

20. The reformer of claim 19 wherein said packing comprises high void fraction pall rings or saddles.

21. The reformer of claim 10, further comprising a heat exchange member disposed within said vessel and in thermal communication with said reformate stream, said heat exchange member receiving a feed stream comprising water and vaporizing said feed stream therein by heat exchange with said reformate stream to produce a steam stream.

22. The reformer of claim 21 wherein said heat exchange member comprises a helical coil.

23. The reformer of claim 22 wherein said helical coil comprises a finned tube helical coil disposed within an alloy steel sheet metal annulus.

24. The reformer of claim 17, further comprising a second heat exchange member disposed within said vessel and fluidly connected to said first heat exchange member and in thermal communication with said reformate stream, said second heat exchange member receiving a feed stream comprising water and vaporizing said feed stream therein by heat exchange with said reformate stream to produce said steam stream.

25. The reformer of claim 24 wherein said second heat exchange member comprises a helical coil.

26. The reformer of claim 25 wherein said helical coil comprises a finned tube helical coil disposed within an alloy steel sheet metal annulus.

27. The reformer of claim 1, further comprising a fuel vaporizer disposed within said vessel and fluidly connected to one of said first and second reactant manifolds, said fuel vaporizer comprising a helical coil.

28. The reformer of claim 10, further comprising a fuel vaporizer disposed within said vessel and fluidly connected to one of said first and second reactant manifolds, said fuel vaporizer comprising a helical coil.

29. The reformer of claim 17, further comprising a fuel vaporizer disposed within said vessel and comprising a helical coil, said fuel vaporizer fluidly connected to said first heat exchange member for receiving a steam stream therefrom and fluidly connected to one of said first and second reactant manifolds.

30. The reformer of claim 21, further comprising a fuel vaporizer disposed within said vessel and fluidly connected to one of said first and second reactant manifolds, said fuel vaporizer comprising a helical coil.

31. The reformer of claim 24, further comprising a fuel vaporizer disposed within said vessel and comprising a helical coil, said fuel vaporizer fluidly connected to said first heat exchange member for receiving a steam stream therefrom, and fluidly connected to one of said first and second reactant manifolds.

32. The reformer of claim 24 wherein said vessel comprises heat exchange members associated with the external surface of said vessel for flowing a heat exchange fluid therethrough.

33. The reformer of claim 32 wherein said heat exchange members comprise plate coil or helical coil.

34. The reformer of claim 33 wherein said heat exchange fluid comprises said feed stream.

35. The reformer of claim 32 wherein said vessel further comprises an external insulating layer adjacent the exterior surface of said vessel.

36. The reformer of claim 31 wherein said vessel comprises heat exchange members associated with the external surface of said vessel for flowing a heat exchange fluid therethrough.

37. The reformer of claim 36 wherein said heat exchange members comprise plate coil or helical coil.

38. The reformer of claim 37 wherein said heat exchange fluid comprises said feed stream.

39. The reformer of claim 36 wherein said vessel further comprises an external insulating layer adjacent the exterior surface of said vessel.

* * * * *